US009182805B2

(12) United States Patent
Kim et al.

(10) Patent No.: US 9,182,805 B2
(45) Date of Patent: Nov. 10, 2015

(54) DISPLAY DEVICE AND METHOD TO CONTROL DRIVING VOLTAGES BASED ON CHANGES IN DISPLAY IMAGE FRAME FREQUENCY

(75) Inventors: Minki Kim, Namyul-ri (KR); Jinsung Kim, Gumi-Si (KR); Hwanjoo Lee, Daegu (KR); Junghoon Woo, Siheung-si (KR)

(73) Assignee: LG Display Co., Ltd., Seoul (KR)

( * ) Notice: Subject to any disclaimer, the term of this patent is extended or adjusted under 35 U.S.C. 154(b) by 42 days.

(21) Appl. No.: 13/536,540

(22) Filed: Jun. 28, 2012

(65) Prior Publication Data

US 2013/0002641 A1 Jan. 3, 2013

(30) Foreign Application Priority Data

Jun. 30, 2011 (KR) ........................ 10-2011-0064380

(51) Int. Cl.
*G06F 3/038* (2013.01)
*G06F 1/32* (2006.01)
*G09G 3/00* (2006.01)

(52) U.S. Cl.
CPC ................ *G06F 1/3265* (2013.01); *G09G 3/00* (2013.01); *Y02B 60/1242* (2013.01)

(58) Field of Classification Search
CPC .............................. Y02B 60/1242; G09G 3/00
USPC .............................................. 345/212, 76, 87
See application file for complete search history.

(56) References Cited

U.S. PATENT DOCUMENTS

2002/0027540 A1* 3/2002 Lee .................................. 345/87
2002/0158831 A1* 10/2002 Kondoh .......................... 345/97
2004/0041778 A1* 3/2004 Hiraki et al. .................. 345/100
2005/0062691 A1* 3/2005 Tamura et al. .................. 345/76
2008/0106542 A1* 5/2008 Park et al. ..................... 345/212
2009/0115773 A1* 5/2009 Wu ............................... 345/214
2010/0123703 A1* 5/2010 Guo et al. ..................... 345/211
2011/0109624 A1* 5/2011 Greenberg et al. ........... 345/419

FOREIGN PATENT DOCUMENTS

CN 101739974 A 6/2010
TW 201025258 A 7/2010

OTHER PUBLICATIONS

Office Action issued in corresponding Chinese Patent Application No. 201210172408.8, mailed Mar. 21, 2014, 11 pages.
Office Action issued in corresponding Taiwan Patent Application No. 101123597, mailed Mar. 27, 2014, 14 pages.

* cited by examiner

*Primary Examiner* — Jonathan Blancha
(74) *Attorney, Agent, or Firm* — Brinks Gilson & Lione

(57) ABSTRACT

A display device includes a display panel having a plurality of gate lines and a plurality of data lines crossing each other and pixels formed at intersections thereof; a gate driving circuit that generates a gate pulse based on a gate power voltage and applies the gate pulse to the gate lines; a data driving circuit that divides the data power voltage to convert input digital video data into an analog data voltage and applies the data voltage to the data lines; a power voltage control circuit that detects an input frame frequency and generates a different power control signal in accordance with the detected frame frequency; and a power voltage adjusting circuit that adjusts at least one of the gate power voltage and the data power voltage differently from a predetermined reference level in response to the power control signal.

18 Claims, 8 Drawing Sheets

DISPLAY DEVICE AND METHOD TO CONTROL DRIVING VOLTAGES BASED ON CHANGES IN DISPLAY IMAGE FRAME FREQUENCY

This application claims the priority and the benefit under 35 U.S.C. §119(a) on Patent Application No. 10-2011-0064380 filed in Republic of Korea on Jun. 30, 2011, the entire contents of which are hereby incorporated by reference.

BACKGROUND

1. Field of the Invention

Embodiments of the disclosure relate to a display device, and more particularly, to a display device, which can change a frame frequency based on the properties of a display image.

2. Discussion of the Related Art

Known display devices for image display include a cathode ray tube, a liquid crystal display LCD, an organic light emitting diode OLED, a plasma display panel (PDP), and an electrophoretic display (EPD).

The display devices include a display panel on which pixels and signal lines are formed, a driving circuit unit for driving the signal lines of the display panel, and a power voltage generating circuit for generating a power voltage required to drive the driving circuit unit.

The signal lines comprise data lines supplied with data voltages and gate lines supplied with gate pulses for selecting pixels supplied with data voltages. The driving circuit unit comprises a data driving circuit for driving the data lines and a gate driving circuit for driving the gate lines. The power voltage generating circuit supplies a data power voltage to the data driving circuit, and supplies a gate high voltage and a gate low voltage (a gate power voltage) to the gate driving circuit. The data power voltage is fixed, and the gate power is fixed.

For such a display device, the technology for changing the frame frequency according to the properties of a display image is known. In this technology, the frame frequency of a dynamic image showing a relatively large change in the image between adjacent frames is controlled to be a first value (e.g., 60 Hz), and the frame frequency of a static image showing a relatively small change in the image between the adjacent frames is controlled to be a second value (e.g., 40 Hz). The displaying of an image at a frame frequency of 40 Hz has the advantage of lower power consumption compared to the displaying of an image at a frame frequency of 60 Hz.

As shown in FIG. 1, when the frame frequency is changed, 1 horizontal period (1H), i.e., charging time, for charging a data voltage in the pixels is varied. The charging time at the frame frequency of 40 Hz is longer than the charging time at the frame frequency of 60 Hz. As a result, the charging amount CA2 at the frame frequency of 40 Hz is more than the charging amount CA1 at the frame frequency of 60 Hz. In realizing the same gray level, a charging amount difference depending on frame frequency causes a change in the luminance of the display image, thereby degrading the display quality. In FIG. 1, ‘GP’ represents a gate pulse, and ‘CP’ represents a data voltage charging pulse.

The reason why the charging amount varies depending on frame frequency is because the power voltage required for driving the driving circuit unit is generated at a fixed level. Particularly, if the frame frequency is decreased from 60 Hz to 40 Hz when the power voltage is fixed, the effect of power consumption reduction is not high.

BRIEF SUMMARY

In one aspect, there is a display device including a display panel having a plurality of gate lines and a plurality of data lines crossing each other and pixels formed at intersections thereof; a gate driving circuit that generates a gate pulse based on a gate power voltage and applies the gate pulse to the gate lines; a data driving circuit that divides the data power voltage to convert input digital video data into an analog data voltage and applies the data voltage to the data lines; a power voltage control circuit that detects an input frame frequency and generates a different power control signal in accordance with the detected frame frequency; and a power voltage adjusting circuit that adjusts at least one of the gate power voltage and the data power voltage differently from a predetermined reference level in response to the power control signal.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE DRAWINGS AND THE PRESENTLY PREFERRED EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Exemplary embodiments of the invention will be described in detail with reference to FIGS. 2 to 12.

Figure 1:
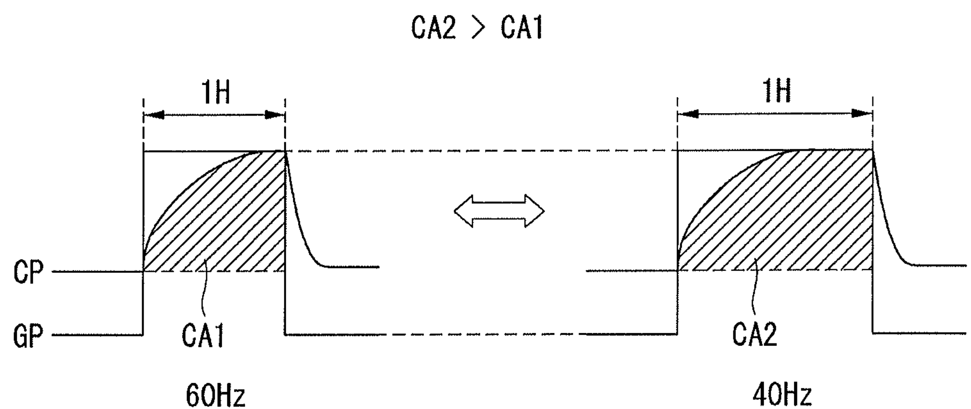
FIG. 1 is a view showing one example in which the charging time varies depending on frame frequency in the conventional art.
Figure 2:
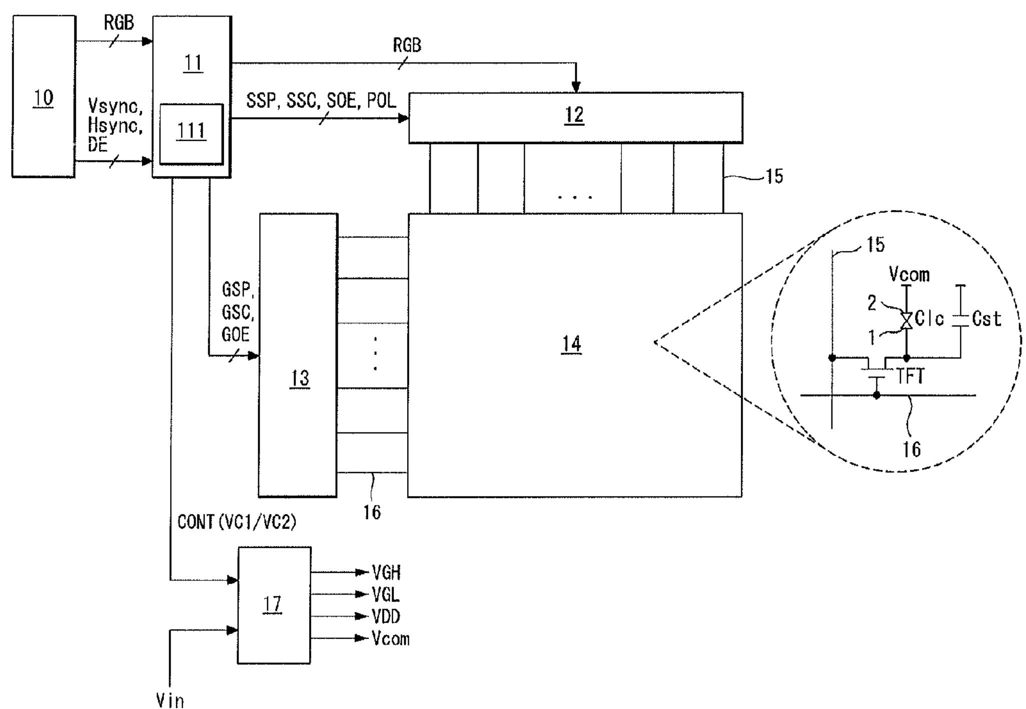
FIG. 2 is a view showing a display device according to an exemplary embodiment of the present invention.

FIG. 2 is a block diagram showing a display device according to an exemplary embodiment of the present invention.

The display device according to the exemplary embodiment of the present invention may be implemented as a liquid crystal display LCD, an organic light emitting diode OLED, a plasma display panel PDP, and an electrophoretic display EPD. Hereinafter, the exemplary embodiment will be described, taking an example in which the display device is implemented as a liquid crystal display.

Referring to FIG. 2, the display device comprises a system board 10, a timing controller 11, a data driving circuit 12, a gate driving circuit 13, a display panel 14, a power voltage control circuit 111, and a power voltage adjusting circuit 17.

The system board 10 is connected to an external video source interface circuit (not shown) and receives image data from the external video source interface circuit. The system board 10 comprises a graphic processing circuit (not shown) for processing input image data and a power supply circuit for generating a voltage Vin to be supplied to the power adjusting circuit 17.

The system board 10 changes the frame frequency according to the properties of image data inputted from the external video source interface circuit. The system board 10 controls the frame frequency of a dynamic image showing a relatively large change in the image between adjacent frames to be a reference value and controls the frame frequency of a static image showing a relatively small change in the image between the adjacent frames to be a specific value smaller than the reference value. The reference value may be 60 Hz, but is not limited thereto. The specific value may be 40 Hz, but is not limited thereto. For example, when the reference value is 60 Hz, 75 Hz, 120 Hz, and 240 Hz, the specific value may be 40 Hz, 60 Hz, 60 Hz, and 120 Hz. The embodiment of the invention is described based on the reference value of 60 Hz and the specific value of 40 Hz for the sake of brevity and ease of reading. The system board 10 outputs digital video data RGB and timing signals Vsync, Hsync, and DE of the dynamic image based on the frame frequency of 60 Hz. Also, the system board 10 outputs digital video data RGB of a static image and timing signals Vsync, Hsync, and DE based on the frame frequency of 40 Hz. The timing signal Vsync is a vertical synchronization signal. The timing signal Hsync is a horizontal synchronization signal. The timing signal DE is a data enable signal.

The timing controller 11 aligns digital video data RGB inputted from the system board 10 in accordance with the display panel 14 and supplies the digital video data RGB to the data driving circuit 12.

The timing controller 11 receives timing signals Vsync, Hsync and DE from the system board 10. The timing controller 11 generates data control signals for controlling the operation timing of the data driving circuit 12 using the timing signals Vsync, Hsync, and DE based on the frame frequency of 60 Hz or 40 Hz and gate control signals for controlling the operation timing of the gate driving circuit 13.

The data control signals are for controlling the operation timing of the data driving circuit 12 based on the frame frequency of 60 Hz or 40 Hz, and comprise a source start pulse SSP, a source sampling clock SSC, a source output enable SOE and a polarity control signal POL. The source start pulse SSP controls a data sampling start point of the data driving circuit 12. The source sampling clock SSC is a clock signal for controlling a sampling operation of data within the source drive integrated circuit (IC) of the data driving circuit 12 based on a rising or falling edge. The polarity control signal POL inverts the polarity of a data voltage outputted from the data driving circuit 12 every N horizontal period, and N is a positive integer. The source output enable signal SOE controls the output timing of the data driving circuit 12.

The gate control signals are for controlling the operation timing of the gate driving circuit 13 based on the frame frequency of 60 Hz or 40 Hz, and comprise a gate start pulse GSP, a gate shift clock GSC and a gate output enable GOE. The gate start pulse GSP controls the timing of a first gate pulse applied to a first gate line. The gate shift clock GSC is a clock signal for shifting the gate start pulse GSP. The gate output enable signal GOE controls the output timing of the gate driving circuit 13.

The data driving circuit 12 comprises a plurality of source drive ICs. Each of the source drive ICs samples and latches the digital video data RGB received from the timing controller 11 in response to the data control signal from the timing controller 11 and converts the latched digital video data RGB into parallelized data. Each source drive IC converts the parallelized data into an analog gamma compensation voltage and generates positive and negative analog video data voltages by which the pixels are charged. Each source driver IC inverts the polarities of the positive and negative analog data voltages under the control of the timing controller 11 and supplies the inverted analog data voltages to the data lines 15.

The gate driving circuit 13 comprises a plurality of gate driving ICs. Each of the gate driving ICs generates a gate pulse swinging between a gate high voltage VGH and a gate low voltage VGL in response to the gate control signals GSP, GSC and GOE outputted from the timing controller 11, and sequentially supplies the gate pulse to the gate lines 16. The gate driving circuit 13 may be formed in a GIP (Gate In Panel) type and be disposed in a non-display area outside an effective display area with a pixel array in the display panel 14. By the GIP method, the gate driving circuit 13 may be formed together with the pixel array in the TFT process of the pixel array.

The display panel 14 may be implemented as a liquid crystal display panel. The display panel 14 comprises an upper glass substrate and a lower glass substrate both of which face to each other with a liquid crystal layer interposed therebetween. A pixel array for image display is formed on the lower glass substrate of the display panel 14 and includes TFTs, pixel electrodes 1, a common electrode 2 and a storage capacitor Cst. The TFTs are formed at intersections of the data lines 15 and the gate lines 16. The pixel electrodes 1 connect to the TFTs. The common electrode 2 faces the pixel electrode 1. The storage capacitor Cst connects to the TFTs and the pixel electrodes 1. Liquid crystal cells Clc are connected to the TFTs and driven by an electric field between the pixel electrodes 1 and the common electrode 2.

Black matrices, color filters, etc. are formed on the upper glass substrate of the display panel 14. The common electrode 2 may be formed on the lower glass substrate together with the pixel electrodes 1 in a horizontal electric field driving method such as an in-plane switching (IPS) mode or a fringe field switching (FFS) mode. The common electrode 2 may be formed on the lower glass substrate along with the pixel electrodes 1 in a horizontal electric field driving method such as an in-plane switching (IPS) mode or a fringe field switching (FFS) mode.

Polarizing plates are respectively attached to the upper and lower glass substrates of the display panel 14, and alignment films for setting a pre-tilt angle of liquid crystals are respectively formed on the upper and lower glass substrates of the display panel 14.

A liquid crystal mode for the display panel 14 applicable in the present invention may be implemented by any other liquid crystal modes as well as the TN mode, the VA mode, the IPS mode and the FFS mode. Moreover, the display of the present invention may be implemented in any form such as a transmissive liquid crystal display, a semi-transmissive liquid crystal display and a reflective liquid crystal display. For the transmissive liquid crystal display and the semi-transmissive liquid crystal display, a backlight unit is required. The backlight unit may be a direct type backlight unit or an edge type backlight unit.

The power voltage control circuit 111 detects an input frame frequency by timing signals Vsync, Hsync, and DE inputted from the system board 10 and generates a power control signal CONT according to the detected frame frequency. The power voltage control circuit 111 may be incorporated in the timing controller 11. The power voltage control circuit 111 will be described later in conjunction with FIGS. 3 and 4.

The power voltage adjusting circuit 17 generates a gate power voltage, a data power voltage and a common voltage Vcom based on the voltage Vin inputted from the system board 10. The data power voltage comprises a high potential power voltage VDD, which is applied to a high potential input end of a gamma resistor string incorporated in the data driving circuit 12. The gate power voltage comprises a gate high voltage VGH and a gate low voltage VGL both of which are applied to the gate driving circuit 13. The gate high voltage VGH is generated at a level for turning on the TFTs of the display panel 14, and the gate low voltage VGL is generated at a level for turning off the TFTs of the display panel 14. The common voltage Vcom is applied to the common electrode 2 of the display panel 14.

To minimize luminance changes and increase the effect of power consumption reduction when the frame frequency is changed depending on the properties of an image, the power voltage adjusting circuit 17 adjusts the gate power voltage and/or data power voltage in response to a power control signal CONT inputted from the power voltage control circuit 111. The power voltage adjusting circuit 17 will be described later in conjunction with FIG. 3 and FIGS. 5 to 11.

Figure 3:
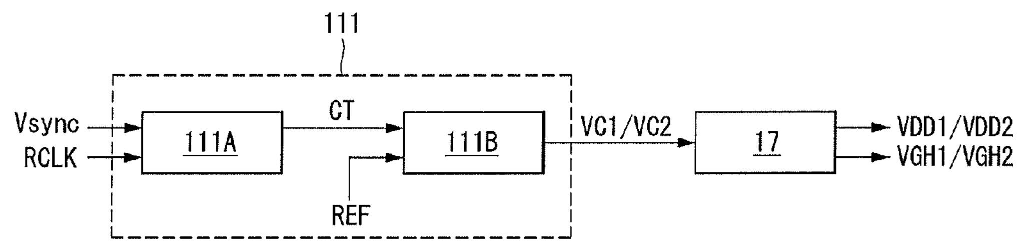
FIG. 3 is a view showing the detailed configuration of a power voltage control circuit and the output of a power voltage adjusting circuit in response to power control signals.
Figure 4:
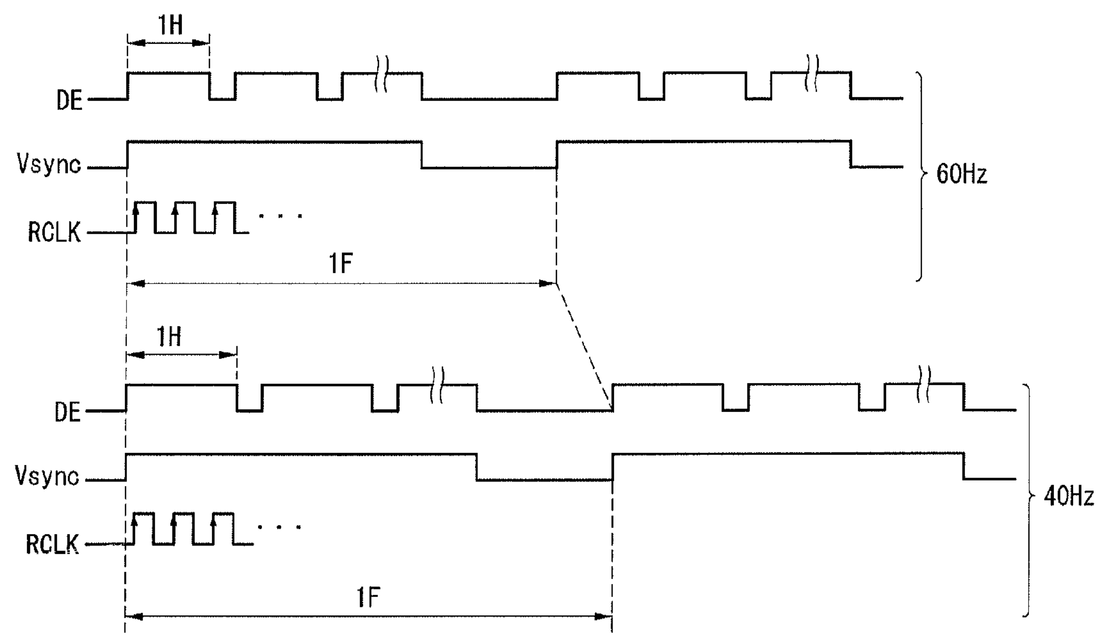
FIG. 4 shows a frame frequency detection operation of the power voltage control circuit.

FIG. 3 shows the detailed configuration of the power voltage control circuit 111 and the output of the power voltage adjusting circuit 17 in response to the power control signal CONT which may be comprise a first power control signal VC1 and a second power control signal VC2. FIG. 4 shows a frame frequency detection operation of the power voltage control circuit 111.

Referring to FIG. 3, the power voltage control circuit 111 comprises a counter 111A and a comparator 111B.

The counter 111A outputs a count value CT by counting the vertical synchronization signal Vsync inputted from the system board 10 by using a reference clock RCLK. The vertical synchronization signal Vsync may be counted directly by the timing controller 11 according to the data enable signal DE inputted from the system board 10. The reference clock RCLK may be generated by an oscillator incorporated in the timing controller 11.

One frame period 1F defined by the vertical synchronization signal Vsync is varied depending on frame frequency. One frame period 1F corresponding to a specific frame frequency of 40 Hz is longer than one frame period 1F corresponding to the reference frame frequency of 60 Hz. Accordingly, the count value CT for the frame frequency of 40 Hz based on the same reference clock RCLK is greater than the count value CT for the frame frequency of 60 Hz.

The comparator 111B compares a count value CT inputted from the counter 111A with a preset reference value REF. The reference value REF is set to be the same as the count value CT for the reference frame frequency of 60 Hz. If the count value CT inputted from the counter 111A is the same as the reference value REF, the comparator 111B outputs a first power control signal VC1 corresponding to the reference frame frequency of 60 Hz. If the count value CT inputted from the counter 111A is greater than the reference value REF, the comparator 111B outputs a second power control signal VC2 corresponding to a specific frame frequency of 40 Hz.

The first power control signal VC1 is inputted into the power voltage adjusting circuit 17 to control the power voltage adjusting circuit 17 so that the gate power voltage and data power voltage is maintained at a predetermined reference level VDD1/VGH1. The second power control signal VC2 is inputted into the power voltage adjusting circuit 17 to control the power voltage adjusting circuit 17 so that the gate power voltage and/or data power voltage is changed to an adjusted level VDD2/VGH2 lower than the reference level VDD1/VGH1.

Figure 5:
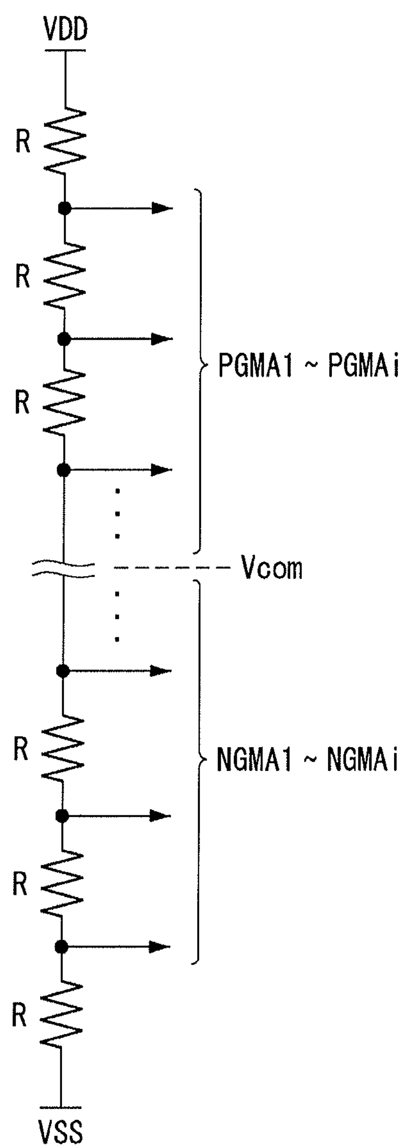
FIG. 5 is a view showing a gamma resistor string incorporated in the data driving circuit.
Figure 6:
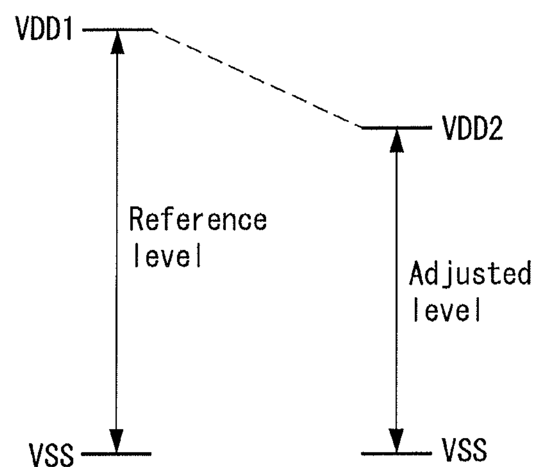
FIG. 6 shows an example in which the data power voltage is adjusted depending on frame frequency.
Figure 7:
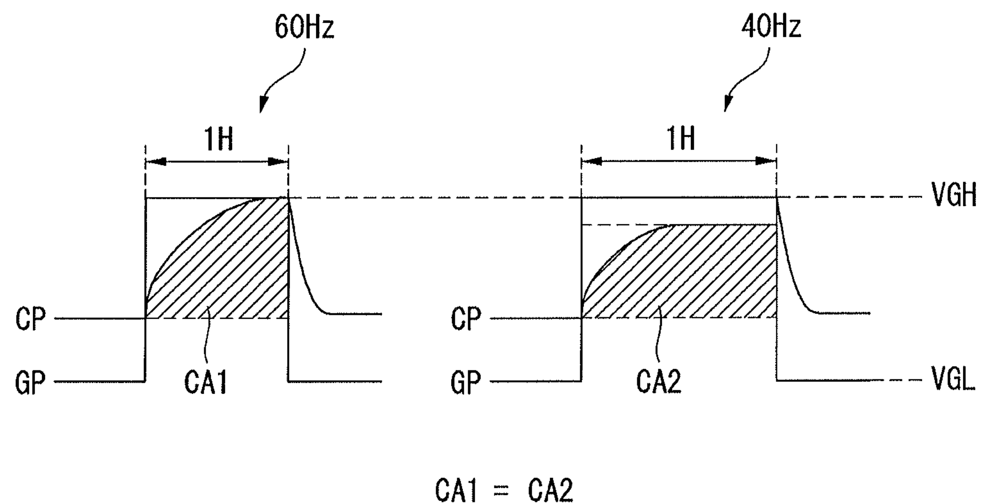
FIG. 7 shows an operational effect of data power voltage control.

FIG. 5 shows a gamma resistor string incorporated in the data driving circuit. FIG. 6 shows an example in which the data power voltage is adjusted depending on frame frequency. FIG. 7 shows an operational effect of data power voltage control. In FIG. 7, 'GP' represents a gate pulse, and 'CP' represents a data voltage charging pulse.

Referring to FIG. 5, the data driving circuit comprises a gamma resistor string for converting digital video data into an analog data voltage. The gamma resistance string is provided with a plurality of resistors R serially connected between a high potential end into which a high potential power voltage VDD is inputted and a low potential end into which a ground voltage VSS is inputted. The gamma resistor string subdivides gamma reference voltages divided between the high potential power voltage VDD and the ground voltage VSS into a number of gray levels representable in the number of bits of the digital video data, thereby generating positive gamma compensation voltages PGMA1 to PGMAi and negative gamma compensation voltages NGMA1 to NGMAi corresponding to each gray level.

Referring to FIG. 6, at the reference frame frequency of 60 Hz, the high potential power voltage VDD is generated at a predetermined reference level VDD1 in accordance with the reference frame frequency of 60 Hz in response to a first power control signal VC1. At a specific frame frequency of 40 Hz, the high potential power voltage VDD is generated at an adjusted level VDD2 lower than the reference level VDD1 in response to a second power control signal VC2.

As shown in FIG. 7, when the frame frequency is changed, one horizontal period 1H, i.e., charging time, for supplying a data voltage to the pixels is varied. The charging time at the frame frequency of 40 Hz is longer than the charging time at the frame frequency of 60 Hz. If the high potential power voltage VDD is maintained at the reference level VDD1 when the frame frequency is changed from 60 Hz to 40 Hz, a luminance change occurs due to a difference of the charging amount as in the conventional art. However, if the high potential power voltage VDD is lowered to the adjusted level VDD2 when the frame frequency is changed from 60 Hz to 40 Hz, luminance changes are minimized. This is because, if the high potential power voltage VDD is lowered to the adjusted level VDD2 at 40 Hz, the overall voltage level of the gamma compensation voltages is also decreased, and therefore the charging amount to be charged in the pixels is decreased. As shown in FIG. 7, the adjusted level VDD2 may be preset such that the pixel charging amount CA2 at the specific frame frequency of 40 Hz is substantially identical to the pixel charging amount CA1 at the frame frequency of 60 Hz.

If the high potential power voltage VDD is adjusted as described above, following a frame frequency change depending on the properties of an image, the luminance changes caused by the frequency change can be minimized. Moreover, the output swing width of a data driving circuit is decreased in realizing a static image, thereby maximizing the effect of power consumption reduction.

Figure 8:
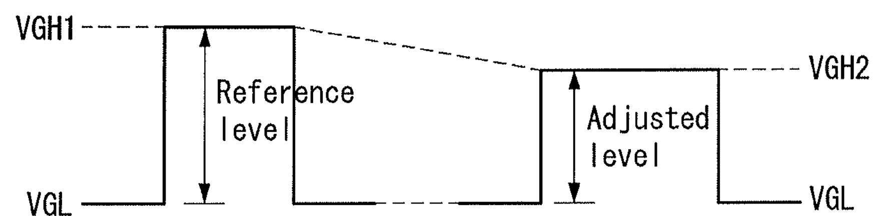
FIG. 8 shows an example in which the gate power voltage is adjusted depending on frame frequency.
Figure 9:
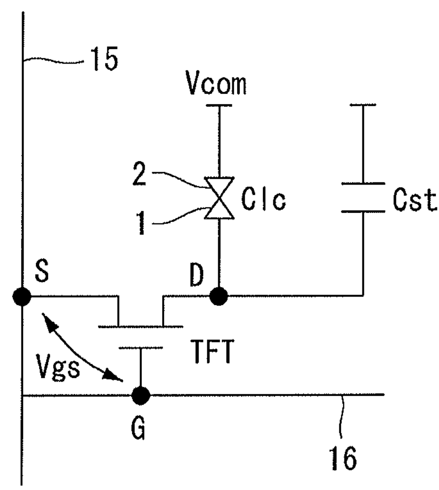
FIG. 9 shows the connection configuration of TFTs formed on a display panel.
Figure 10:
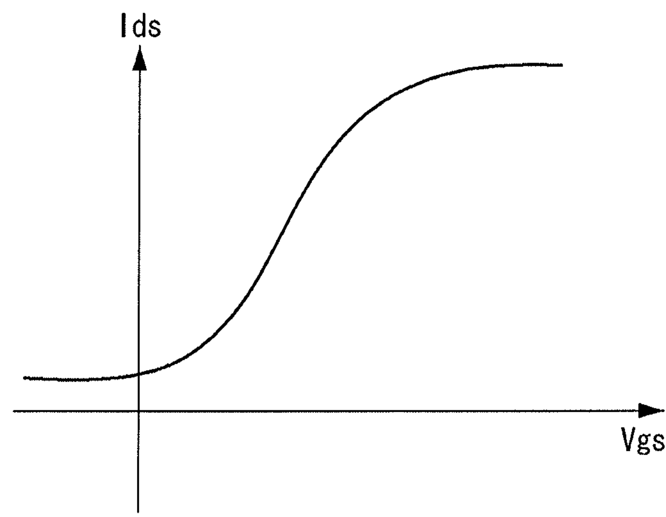
FIG. 10 shows a graph of the driving characteristics of the TFTs.
Figure 11:
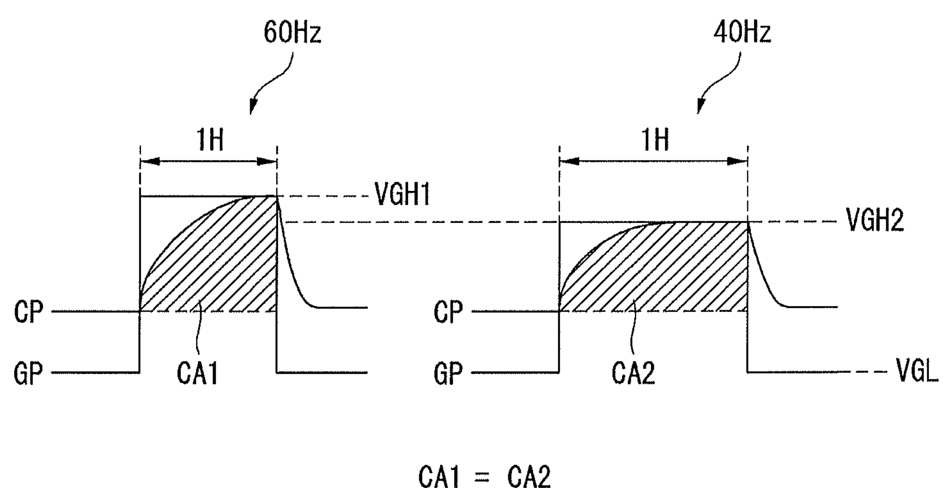
FIG. 11 shows an operational effect of gate power voltage adjustment.

FIG. 8 shows an example in which the gate power voltage is adjusted depending on frame frequency. FIG. 9 shows the connection configuration of TFTs formed on a display panel. FIG. 10 shows a graph of the driving characteristics of the TFTs. FIG. 11 shows an operational effect of gate power voltage adjustment. In FIG. 11, 'GP' represents a gate pulse, and 'CP' represents a data voltage charging pulse.

Referring to FIG. 8, at the reference frame frequency of 60 Hz, the gate high voltage VGH is generated at a predetermined reference level VGH1 in accordance with the reference frame frequency of 60 Hz in response to a first power control signal VC1. At a specific frame frequency of 40 Hz, the gate high voltage VGH is generated at an adjusted level VGH2 lower than the reference level VGH1 in response to a second power control signal VC2.

As shown in FIG. 9, the TFT comprises a gate electrode G connected to a gate line 16, a source electrode S connected to a data line 15, and a drain electrode D connected to a pixel electrode 1. The TFT is turned on during the application of a gate pulse at a gate high voltage VGH to permit a current path between the data line 15 and the pixel electrode 1, and turned off during the application of a gate pulse at a gate low voltage VGL to block the current path between the data line 15 and the pixel electrode 1.

The current Ids flowing between the source electrode S and drain electrode D of the TFT is determined by a voltage difference Vgs between the gate electrode G and source electrode S of the TFT as shown in FIG. 10. The less the voltage difference Vgs between the gate electrode G and source electrode S of the TFT, the current Ids flowing between the source electrode S and drain electrode D of TFT is reduced.

As shown in FIG. 11, when the frame frequency is changed, one horizontal period 1H, i.e., charging time, for supplying a data voltage to the pixels is varied. The charging time at the frame frequency of 40 Hz is longer than the charging time at the frame frequency of 60 Hz. If the gate high voltage VGH is maintained at the reference level VGH1 when the frame frequency is changed from 60 Hz to 40 Hz, a luminance change occurs due to a difference of the charging amount as in the conventional art. However, if the gate high voltage VGH is lowered to the adjusted level VGH2 when the frame frequency changes from 60 Hz to 40 Hz, luminance changes are minimized. This is because, if the gate high voltage VGH is lowered to the adjusted level VGH2 at 40 Hz, the voltage difference between the gate electrode G and source electrode S of the TFT is decreased. As a result, the current Ids flowing between the source electrode S and the drain electrode D is reduced, thereby reducing the charging amount to be charged in the pixel. As shown in FIG. 11, the adjusted level VGH2 may be preset such that the pixel charging amount CA2 at 40 Hz is substantially identical to the pixel charging amount CA1 at 60 Hz.

If the gate high voltage VGH is controlled as described above, following a frame frequency change depending on the properties of an image, luminance changes caused by the frequency change can be minimized. Moreover, the output swing width of a data driving circuit is decreased in realizing a static image, thereby maximizing the effect of power consumption reduction.

Meanwhile, FIGS. 5 to 7 show an example in which only the data power voltage is adjusted when the gate power voltage is fixed at a reference level, and FIGS. 8 to 11 show an example in which only the gate power voltage is adjusted when the data power voltage is fixed at a reference level. The technical idea of the present invention is not limited thereto, but may include simultaneous adjustment of both of the gate power voltage and the data power voltage. In this case, two adjusted levels VDD2 and VGH2 may be properly set such that the pixel charging amount CA2 at 40 Hz is substantially identical to the pixel charging amount CA1 at 60 Hz.

Figure 12:
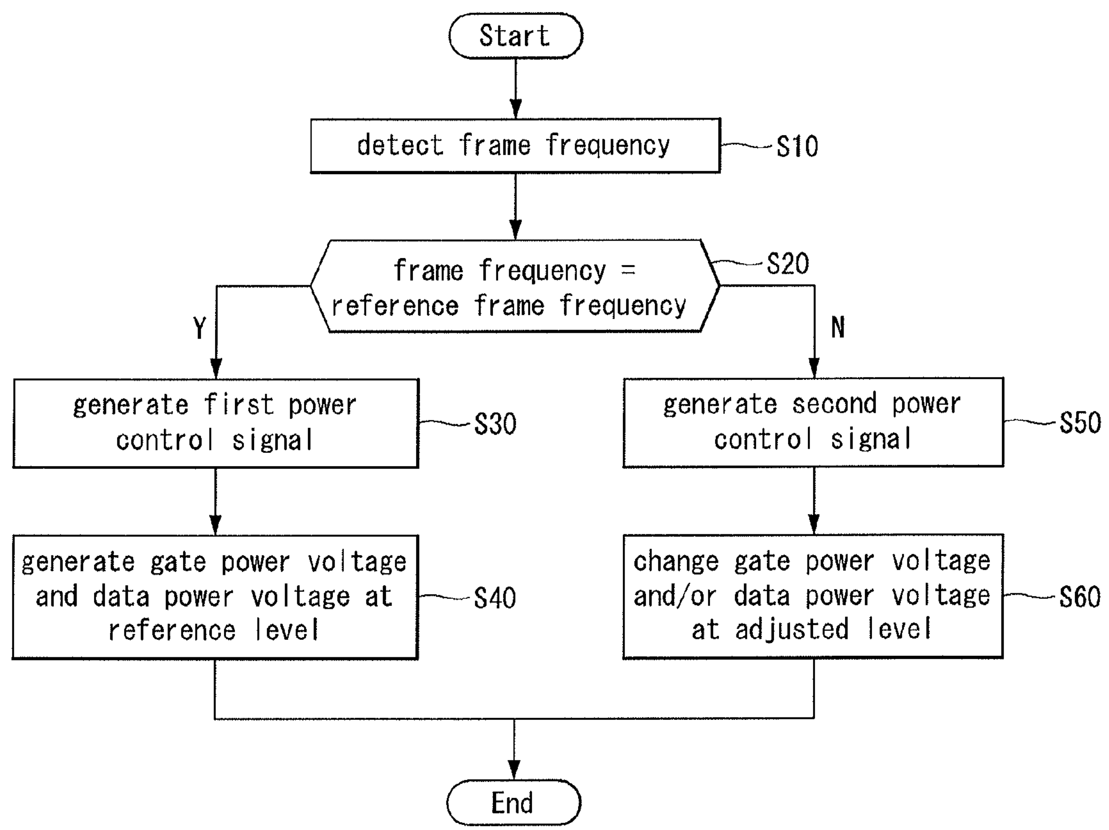
FIG. 12 sequentially shows a method for driving a display according to an exemplary embodiment of the present invention.

FIG. 12 sequentially shows a method for driving a display according to an exemplary embodiment of the present invention.

Referring to FIG. 12, in the method for driving a display, an input frame frequency is detected based on timing signals (S10).

In the method for driving a display, it is determined whether the detected input frame frequency is identical to a predetermined reference frame frequency of 60 Hz (S20).

As a result of the determination of S20, if the detected frame frequency is identical to a predetermined reference frame frequency of 60 Hz (Y), a first power control signal is generated (S30), and a gate power voltage and a data power voltage are generated at a predetermined reference level in accordance with the reference frame frequency of 60 Hz in response to the first power control signal (S40).

As a result of the determination of S20, if the detected frame frequency is not identical to a predetermined reference frame frequency of 60 Hz (N), a second power control signal is generated (S50), and the gate power voltage and the data power voltage are changed to an adjusted level lower than the predetermined reference level (S60).

As described above, in the display device and the driving method thereof according to the present invention, a data power voltage and/or gate power voltage are adjusted to be lower than a predetermined reference level in accordance with the reference frame frequency, following a frame frequency change depending on the properties of an image. By this, the display device and the driving method according to the present invention can minimize luminance changes caused by a frequency change, and reduce the output swing width of the data driving circuit and/or gate driving circuit in realizing a static image, thereby maximizing the effect of power consumption reduction.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A display device comprising:

a display panel comprising a plurality of pixels, each pixel comprising a thin film transistor (TFT) formed at an intersection of a data line and a gate line, a pixel electrode connected to the TFT, and a common electrode and a storage capacitor (Cst) connected to the TFT and the pixel electrode;

a power voltage control circuit configured to detect an input frame frequency depending on properties of an image and generate a power control signal in accordance with the input frame frequency;

a power voltage adjusting circuit configured to adjust a voltage level of a data power voltage comprising a high potential power voltage (VDD) differently from a predetermined reference voltage level according to the power control signal and configured to generate the adjusted high potential power voltage; and a data driving circuit comprising a gamma resistor string configured to convert a digital video data into an analog data voltage, wherein the gamma resistor string divides gamma reference voltages between the adjusted high potential power voltage and a ground voltage fixed corresponding to each gray level that is representable in the number of bits of the digital video data, and configured to generate adjusted gamma compensation voltages to be charged to the pixels according to the adjusted high potential power voltage, wherein said adjusted gamma compensation voltages are configured to minimize luminance changes in the pixels by steady maintenance of a charging amount to be charged to the pixels irrespective of the input frame frequency.

2. The display device of claim 1, wherein the power voltage control circuit comprises:

a counter configured to count a vertical synchronization signal by using a reference clock to obtain a count value; and a comparator configured to compare the count value with a predetermined reference value, and generate a first power control signal corresponding to a reference frame frequency in response to the count value being identical to the reference value, and generate a second power control signal corresponding to a specific frame frequency lower than the reference frame frequency in response to the count value being different from the reference value.

3. The display device of claim 2, wherein the power voltage adjusting circuit is configured to output the high potential power voltage at the predetermined reference voltage level in accordance with the reference frame frequency in response to the first power control signal; and output the adjusted high potential power voltage to be a specific voltage level lower than the reference voltage level in response to the second power control signal to the data driving circuit.

4. The display device of claim 3, wherein the power voltage adjusting circuit is further configured to adjust the voltage applied to the high potential end of the data driving circuit is adjusted to the reference level or the specific level according to the power control signal.

5. The display device of claim 3, wherein the first power control signal is inputted into the power voltage adjusting circuit to control the power voltage adjusting circuit so that the high potential power voltage is maintained at the predetermined reference voltage level and the second power control signal is inputted into the power voltage adjusting circuit to control the power voltage adjusting circuit so that the high potential power voltage is changed to an adjusted level lower than the reference level.

6. The display device of claim 5, wherein the adjusted level may be preset such that the pixel charging amount at the specific frame frequency of 40 Hz is substantially identical to the pixel charging amount at the frame frequency of 60 Hz.

7. The display device of claim 2, wherein when the reference frame frequency is selected to be one of 60 Hz, 75 Hz, 120 Hz, and 240 Hz, the specific frame frequency is selected to be one of 40 Hz, 60 Hz, 60 Hz, and 120 Hz.

8. The display device of claim 1, further comprising:

a system board configured to control the frame frequency of a dynamic image showing a relatively large change in an image between adjacent frames to be a reference value and the frame frequency of a static image showing a relatively small change in the image between the adjacent frames to be a specific value smaller than the reference value.

9. The display device of claim 8, wherein the system board is configured to output a digital video data and timing signals of the dynamic image based on the frame frequency of 60 Hz and the digital video data and timing signals of the static image based on the frame frequency of 40 Hz.

10. The display device of claim 9, wherein the power voltage control circuit is configured to detect the input frame frequency by the timing signals inputted from the system board.

11. A method for driving a display device, the display device comprising a display panel comprising a plurality of pixels with each pixel having a thin film transistor (TFT) formed at an intersection of a data line and a gate line, a pixel electrode connected to the TFT, a common electrode and a storage capacitor (Cst) connected to the TFT and the pixel electrode and a data driving circuit configured to divide gamma reference voltages to convert input digital video data into an analog data voltage and apply the analog data voltage to the data lines, the method comprising:

detecting an input frame frequency and generating a power control signal in accordance with the detected frame frequency change;

adjusting a voltage level differently from a predetermined reference voltage level in a high potential power voltage according to the power control signal, and generating an adjusted high potential power voltage;

dividing the gamma reference voltages between the adjusted high potential power voltage and a ground voltage fixed corresponding to each gray level that is representable in the number of bits of the digital video data; and generating adjusted gamma compensation voltages charged to the pixels according to the adjusted high potential power voltage.

12. The method of claim 11, wherein the generating of the power control signal comprises:

generating a count value by counting a vertical synchronization signal by using a reference clock; and comparing the count value with a predetermined reference value, and generating a first power control signal corresponding to a reference frame frequency if the count value is identical to the reference value, and generating a second power control signal corresponding to a specific frame frequency lower than the reference frame frequency if the count value is different from the reference value.

13. The method of claim 12, further comprising:

outputting the high potential power voltage at the predetermined reference voltage level in accordance with the reference frame frequency in response to the first power control signal; and outputting the adjusted high potential power voltage to a specific voltage level lower than the reference voltage level in response to the second power control signal to the data driving circuit.

14. The method of claim 11, further comprising:

controlling the frame frequency of a dynamic image showing a relatively large change in an image between adjacent frames to be a reference value and the frame frequency of a static image showing a relatively small change in the image between the adjacent frames to be a specific value smaller than the reference value.

15. An apparatus comprising:

a power voltage controller operatively connected to both a data driver and a gate driver of a display panel, the power voltage controller configured to selectively generate, based upon a comparison of a detected frame frequency with a reference frame frequency that are related to characteristics of images on the display panel, one among a first power control signal in response to the detected frame frequency being identical to the reference frame frequency and a second power control signal in response to the detected frame frequency being non-identical to the reference frame frequency; and a power voltage adjuster operatively connected to both the data driver and the gate driver of the display panel, the power voltage adjuster configured to generate or change, based upon either the first power control signal or the second power control signal from the power voltage controller, a gate power voltage and a data power voltage that are respectively applied to high potential ends of the gate driver and the data driver, wherein the data driver corn rises a gamma resistor string that is configured to converts a digital video data into an analog data voltage and divides gamma reference voltages between an adjusted data power voltage and a ground voltage fixed corresponding to each gray level that is representable in the number of bits of the digital video data, and is further configured to generate adjusted gamma compensation voltages to be charged to the pixels according to the adjusted data power voltage, and wherein said adjusted gamma compensation voltages are configured to minimize luminance changes in the pixels by steadily maintaining a charging amount to be charged to the pixels irrespective of the frame frequency.

16. The apparatus of claim 15, wherein the power voltage adjuster is configured to generate, based upon the first power control signal, the gate power voltage and the data power voltage at a reference level.

17. The apparatus of claim 15, wherein the power voltage adjuster is configured to change, based upon the second power control signal, both the gate power voltage and the data power voltage.

18. The apparatus of claim 15, further comprising:

a timing controller configured to transmit an input image signal to the data driver.

* * * * *